Nov. 11, 1924.  1,515,561
R. R. EASTIN
APPARATUS FOR STAMPING OR BRANDING NUTS
Filed Oct. 18, 1923   3 Sheets-Sheet 1

WITNESSES

INVENTOR
R. R. Eastin
BY
ATTORNEYS

Nov. 11, 1924.

R. R. EASTIN 1,515,561

APPARATUS FOR STAMPING OR BRANDING NUTS

Filed Oct. 18, 1923    3 Sheets-Sheet 3

WITNESSES

INVENTOR
R. R. Eastin
BY
ATTORNEYS

Patented Nov. 11, 1924.

1,515,561

UNITED STATES PATENT OFFICE.

ROLLIE ROY EASTIN, OF SEATTLE, WASHINGTON, ASSIGNOR, BY MESNE ASSIGN-
MENTS, OF ONE-HALF TO ELVIRA B. SAMPLES.

APPARATUS FOR STAMPING OR BRANDING NUTS.

Application filed October 18, 1923. Serial No. 669,350.

*To all whom it may concern:*

Be it known that I, ROLLIE ROY EASTIN, a citizen of the United States, and a resident of Seattle, in the county of King and State of Washington, have invented certain new and useful Improvements in Apparatus for Stamping or Branding Nuts, of which the following is a specification.

This invention relates to an apparatus for stamping or branding nuts, and is particularly although not necessarily designed for stamping a distinguishing trade-name upon walnuts or other nuts of similar character.

The object of the invention is to provide an apparatus of this character wherein the nuts are automatically handled and fed to the stamping mechanism and automatically delivered from the stamping mechanism after the brand or stamp has been applied thereto.

A further object is to provide a device of this character and having these advantages and which is at the same time of simple and durable construction, reliable in operation and easy and comparatively inexpensive to manufacture and operate.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 4 is a fragmentary view, in elevation, illustrating the manner in which the drive for the various moving parts is taken from the motor;

Figure 5 is a view in horizontal section, on line 5—5 of Figure 1;

Figure 6 is a view in section on line 6—6 of Figure 5;

Figure 7 is a fragmentary detail view, partly in section and partly in elevation of the stamping device; and Figure 8 is a plan view thereof.

Figure 1:
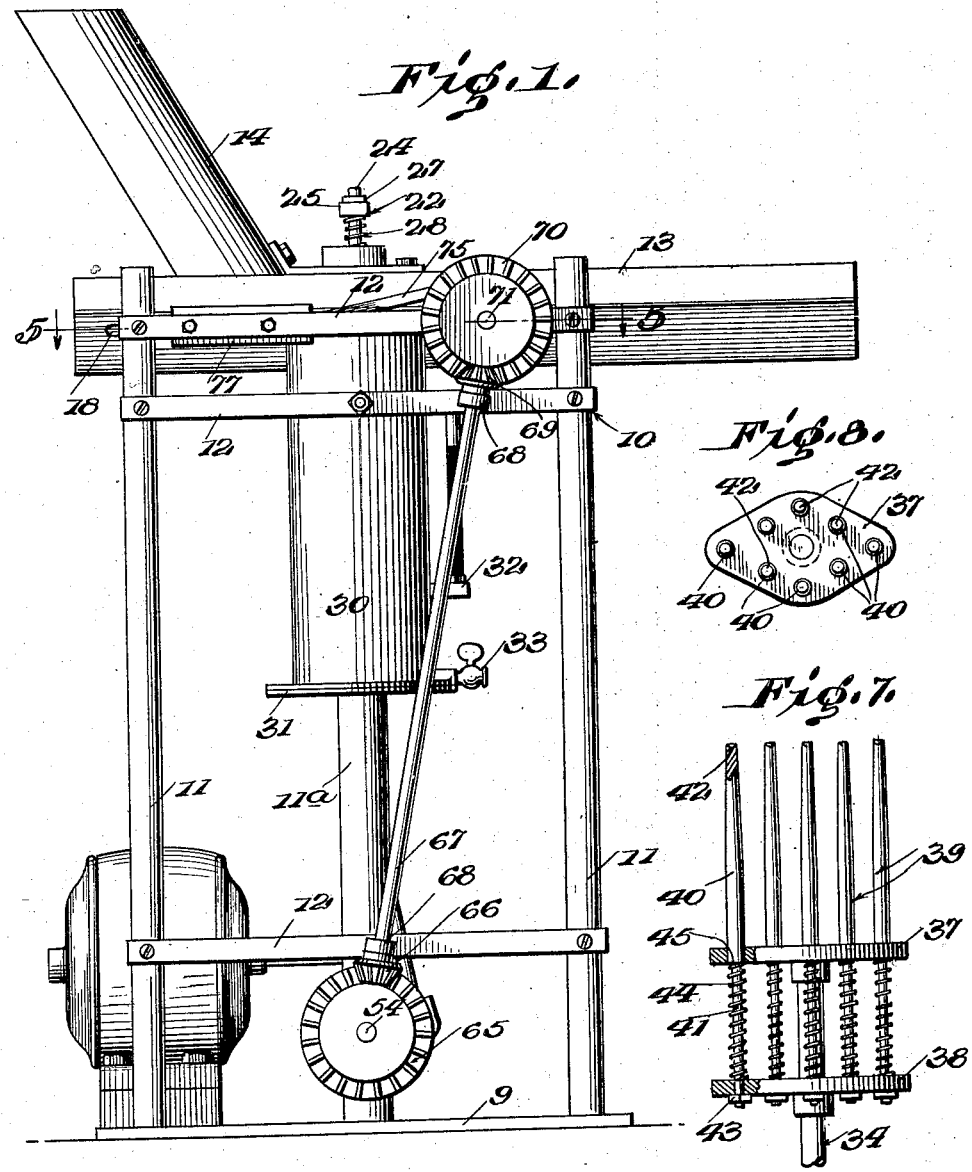
Figure 1 is a view in side elevation, showing a preferred embodiment of the invention.
Figure 3:
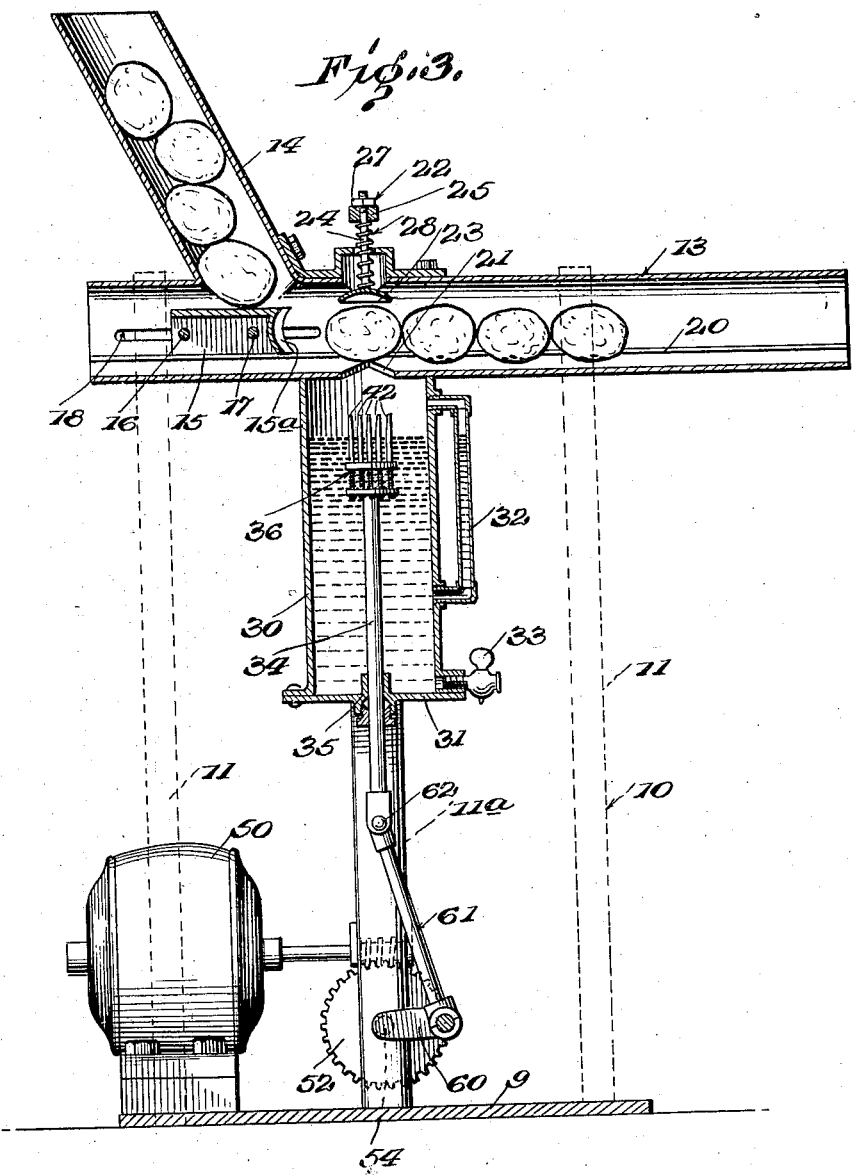
Figure 3 is a view in longitudinal section, on line 3—3 of Figure 2.

Referring to the drawings wherein for the sake of illustration is shown the preferred embodiment of the invention, the numeral 9 designates a suitable base upon which the frame designated generally at 10 made up of two long standards 11, a single short standard 11$^a$, and cross bars 12 secured to and connecting the standards 11 is mounted. An open ended tubular housing 13 of sheet metal or other suitable material is suitably secured and supported on the frame 10 and also rests on the inking cylinders as will be hereinafter fully described. A feed hopper 14 for the nuts leads into the top of the housing 13 adjacent one end thereof and preferably this feed hopper is inclined, as shown in Figures 1 and 3.

The nuts are fed from the hopper 14 into the tubular housing 13 by a feeding mechanism which includes a feed plunger 15 mounted for reciprocatory movement in the housing 13 below the feed hopper 14. This mounting of the plunger 15 is preferably obtained by providing transverse pins 16 and 17 on the plunger which project laterally beyond the sides thereof and operate in guide slots 18 provided therefor in the opposite sides of the tubular housing 13. It will be noted from a consideration of Figure 3 that the hopper 14 is of such size and shape that the nuts feed singly therethrough. Again the feed plunger 15 is disposed below the hopper 14 so that it controls the feed of the nuts from the hopper into the housing 13, as will presently be described.

The nuts fed from the hopper 14 into the housing 13 are received on rails 20 made of wire or light metallic tubing and which extend longitudinally within and are soldered, welded or otherwise suitably secured to the housing 13. The housing 13 is provided in its lower portion with a diamond-shaped opening 21 and this opening 21 is preferably located to the right of the feed hopper as the machine is viewed in Figures 1 and 3. As clearly shown in Figure 5, the rails 20 are bent or deflected laterally, as at 20$^a$ on each side of the opening 21.

Above the opening 21 a resilient holding means for the nuts is provided and is designated generally at 22. Preferably this holding means includes a curved metallic plate 23 which is shaped to correspond to the general contour of the nuts and which is fixed to and carried by the lower end of a stem 24. The stem 24 extends up through an opening provided therefor in the arm 25 fixed to the upper end of the vertical reciprocable shaft 26. A nut 27 has threaded engagement with the upper end of the stem 24 and abuts the top or upper side of the arm 25. A coil spring 28 encircles the stem 24 below the arm 25 and has its upper end engaging the under side of the arm 25 and has its lower end engaging the top of the plate 23. This spring 28 is tensioned to force the plate 23 downwardly and away from the arm 25. The tension of the spring may be varied by adjusting the nut 27. The shaft 26 is mounted and driven in a manner which will be hereinafter fully described.

Figure 2:
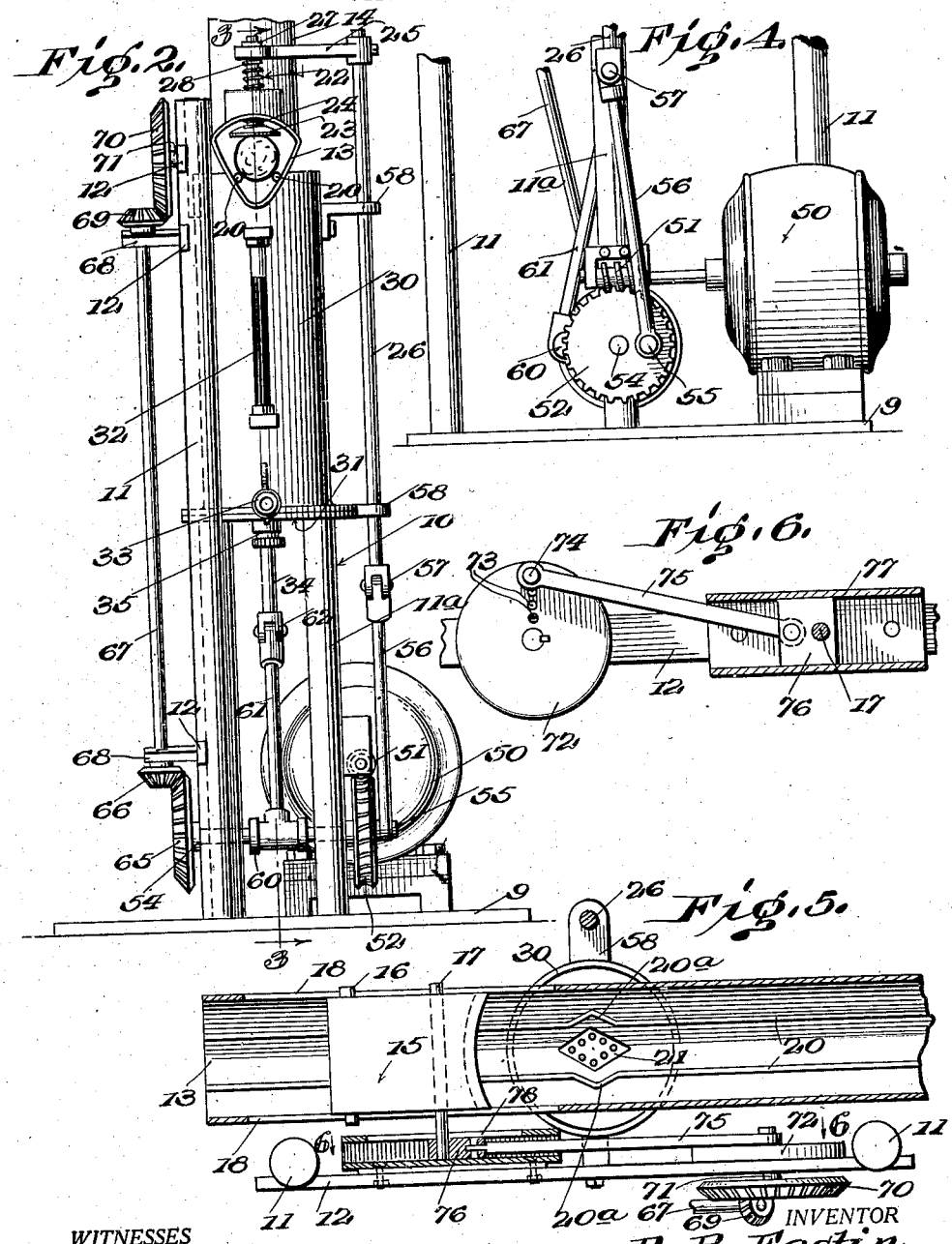
Figure 2 is a view thereof in end elevation.

Below the opening 21 in the housing 13 a cylinder 30 is arranged and is preferably supported on the short standard 11$^a$ and on one of the cross bars 12. The upper end of the cylinder 30 is open and is shaped to receive the housing 13 (see Fig. 2) while the lower end of the cylinder is closed by a head 31. The cylinder contains a supply of ink used in stamping the brand on the nuts and is equipped with a gage 32 and with a drain 33. A vertically reciprocable rod 34 extends axially of the cylinder 30 and through a stuffing box 35 provided therefor in the head 31. At the upper end this rod 34 carries a stamp or brand designated generally at 36. As shown in detail in Figures 7 and 8 this stamping or branding device consists of two approximately diamond-shaped plates 37 and 38 fastened in spaced relation on the rod 34. These plates 37 and 38 are provided with alined apertures arranged in diamond formation and slidably receiving a plurality of pins 39. These pins 39 are of identical construction and each includes a body 40 and a reduced shank 41. The body 40 tapers toward its outer end or tip which is concaved or recessed, as at 42, to insure each pin carrying the proper supply of ink. The body portions 40 of each pin has sliding fit in the opening provided therefor in the plate 37. The reduced shank 41 which extends from each body portion has a sliding fit in the opening provided for it in the plate 38 and on the opposite side of the plate 38 from the plate 37 each shank 41 has threaded thereon a nut 43. Coil springs 44 encircle the shanks 41 between the plates 37 and 38. Each coil spring 44 engages the plate 38 at one end and at its opposite end it engages a shoulder 45 defined at the juncture of the shank and body portion of the pin. These springs 44 are tensioned to urge the pins outwardly on the plates 37 and 38 that is they urge these plates upwardly, as viewed in Figures 3 and 7.

In order to drive the feeding mechanism, the holder, and the branding device in proper sequence, an electric motor 50 is bolted or otherwise suitably secured to the base of the machine and a worm 51 is fixed to its armature and meshes with a worm wheel 52 keyed or otherwise secured on a shaft 54 which is journaled in bearings provided therefor in the frame and extends transversely thereof below the cylinder 30. The outer lateral face of the worm wheel 52 is provided with a laterally projecting crank pin 55 which is pivotally connected to the lower end of a connecting rod 56, the upper end of the crank 56 being pivotally connected, as at 57 to the lower end of the vertical reciprocal shaft 26. This shaft 26 is mounted in guides 58 provided therefor on the cylinder 30. Intermediate its ends the shaft 54 is provided with a crank 60 to which the lower end of a connecting rod 61 is pivotally secured, the upper end of the connecting rod 61 being pivotally connected, as at 62, to the lower end of the rod 34 of the stamping device. On the end of the shaft 54 opposite the worm wheel 52 a beveled gear 65 is fixed and meshes with a beveled pinion 66 secured to the lower end of a shaft 67 mounted in bearings provided therefor in brackets 68. The upper end of this shaft 67 has secured thereto a beveled pinion 69 which meshes with a beveled gear 70 keyed or otherwise secured to one end of a short shaft 71. The short shaft 71 is journaled in a bearing provided therefor in the frame and has fixed thereto a rotatable disk 72 provided with a radial series of openings 73 in any one of which a crank pin 74 is secured to pivotally connect one end of a connecting rod 75 to the disk 72. The other end of the connecting rod is pivotally secured in a vertical slot provided therefor in a cross head 76 which is mounted for reciprocatory movement in a tubular guide 77 fixed to an adjacent portion of the frame. This guide 77 is provided with a lengthwise slot 78 in one of its side walls, as shown in Figure 5. One of the pins 17 which serves to mount the feed plunger 15 in the housing 13 projects from the housing and through a slot 78 in the guide 77 and into an opening provided therefor in the cross head 76 and in this manner the motion of the plunger is transmitted to the plunger 15.

In operation the nuts are fed singly through the feed hopper 14 and the lowermost nut of the feed hopper rests on top of the feed plunger which may be slightly concaved if found desirable. In any event the forward end of the plunger is concaved, as at 15$^a$ in order to adapt it to better engage the nut. When the motor 52 is running it will rotate the shaft 54 through the worm 51 and worm wheel 52 and this motion of the shaft 52 will be transmitted through the beveled gear 65, beveled pinion 66, shaft 67, beveled pinion 69, beveled gear 70, short shaft 71, disk 72, crank pin 74, connecting rod 75, cross head 76 and pin 17 to the feed plunger so as to reciprocate the feed plunger 15 in the housing. When the plunger 15 is moved to the left as viewed in Figure 3 the lowermost nut in the hopper 14 will drop onto the rails 20 into the housing 13 in front of the plunger 15. Then when the plunger moves to the right, as viewed in Figure 3 it will carry the nut with it and into position below the plate 23 of the holder 22 and over the opening 21. When the nut is so positioned the plate 23 will descend and engage the nut and hold it in position over the opening 21 for at this time the shaft 26 has been moved downwardly by the action of the crank pin 55 on the worm wheel 52 and the connecting rod 56. The downward movement of the shaft 26 is transmitted to the plate 23 through the arm 25 and spring 28. The provision of the spring in this motion transmission means and the mounting of the plate so that it is positively supported yet adapted to yield makes it possible for the machine to be readily used with various sizes of nuts. The plate 23 while possessing some resiliency is substantially rigid. With the nut held over the opening 21 the stamping device 36 which has been previously immersed in the ink in the cylinder 30 moves upwardly under the action of the crank 60 and connecting rod 21. As the stamping device 36 moves up through the ink it carries with it a supply of ink on the tip of each pin, the tips being recessed or concaved, as at 42, for this purpose. The pins or fingers 39 are projected from their rigid plates 37 and 38 by the springs 44 which are made sufficiently stiff to insure proper action. Nevertheless these fingers 39 may yield to some extent in order to permit all of them to come into contact and engagement with the nut held by the plate 33. It is to be understood of course that the entire series of pins which are arranged in the embodiment shown in diamond formation project through the similarly arranged opening 21. The formation of the tips of the fingers with the recesses 42 provides cutting or biting edges around the outer end of each finger which bite into the wall of the nut to the desired extent. This cycle of operation is repeated as long as the motor 50 is rotated, and nuts are supplied to the hopper 14. Of course it is to be understood that when one nut is advanced by the feed plunger the preceding nut on the rails 20 is engaged by the nut actuated by the feed plunger and is displaced along the rails 20 until it eventually falls out of the far end of the housing into any suitable container.

I claim:

1. In a machine of the character described, a tubular housing having a pair of spaced rails therein, a feed hopper opening into the top of the housing, feeding mechanism including a plunger reciprocating in the housing and arranged below the hopper, a holding device receiving the nuts from the feeding mechanism and stamping means for stamping the nuts held in the holder.

2. In a machine of the character described, a tubular housing having rails arranged in spaced relation therein and provided with an opening, a feed hopper opening into the top of the housing, a reciprocating feed plunger mounted in the housing below the hopper and delivering the nuts onto the rails above the opening in the housing, a holder including a vertically reciprocal plate engageable with the nuts for holding the same on the rails over the opening in the housing, a stamping device adapted to be projected through the opening in the housing to stamp the nut held on the rails by the plate, a motor, a shaft driven from the motor, motion transmission means between said shaft and the plunger for reciprocating the same, motion transmission means between the shaft and the plate of the holder for depressing the same, and motion transmission means between the shaft and stamping device for elevating and depressing the same.

3. In combination with nut stamping means, a holding device including a reciprocal shaft, an arm fixed thereto, a stem having a slidable fit in said arm, a nut threaded on one end of said stem, a holding plate fitted to the opposite end of the stem, and a coil spring encircling the stem between the plate and the arm.

4. In combination, a housing, spaced supporting rails therein, an inclined feed hopper fitting onto the housing, a horizontal reciprocal feed plunger arranged below said feed hopper, said housing having an opening below the rails to which the feed plunger feeds the nuts, a holding device arranged above the opening and having a plate adapted to engage the nut disposed above the opening to hold the same in position, stamping means including a cylinder arranged below the housing, a vertical reciprocal rod operating in the cylinder, spring projected stamping means for stamping the nuts and adapted to be projected through the opening in the housing, a motor, a shaft driven from the motor, motion transmission means between the shaft and the plunger, said shaft having a crank therein, a connecting rod between said crank and the rod of the stamping mechanism, and motion transmission means between the shaft and the holding device.

5. In combination with a housing having spaced supporting rails therein, a holding device for successively holding each nut in fixed position on said supporting rails, a stamping device for applying a stamp or brand to each nut so held, feeding mechanism for successively feeding the nuts to the holding device and including a reciprocal plunger, a gear, a motor, a shaft driven from the motor, motion transmission means between the shaft and the holding device, motion transmission means between the shaft and the stamping device, and motion transmission means between the shaft and the feed plunger, including beveled gearing, a short shaft driven by said beveled gearing, a disk fixed to said short shaft and having a series of openings, a crank pin adapted to be selectively fixed in any one of said series of openings, a cross head driven from said crank pin, said cross head being operatively connected with said feed plunger.

6. In a nut stamping machine, an elongated tubular housing, spaced rails in said housing, said housing having an opening in its under side, a holding device above the opening for successively holding the nuts in fixed position on the supporting rails above the opening, means for stamping the nuts arranged below the housing and including a stamping device adapted to be projected through the opening of the tubular housing and to coact with the nut held on the rails by the holding device, said inclined feed hopper being adapted to constrain the nuts to feed them singly therethrough, an inclined feed hopper opening into the housing and feeding mechanism for controlling the feed of the nuts from the feed hopper to the holding device and including a reciprocal feed plunger.

ROLLIE ROY EASTIN.